United States Patent Office 2,860,139
Patented Nov. 11, 1958

2,860,139

PROCESS FOR THE PREPARATION OF ISO-CYANURIC ACID MONOVINYLESTER

Helmut Meis and Hubert Sauer, Letmathe, Germany, assignors to Rütgesswerke-Aktiengesellschaft, Frankfurt am Main, Germany No Drawing. Application August 26, 1955
Serial No. 530,908

Claims priority, application Germany September 1, 1954

5 Claims. (Cl. 260—248)

This invention relates to a process for the preparation of isocyanuric acid monovinyl ester and it has particular relation to the preparation of isocyanuric acid monovinylester from triallyl cyanurate.

According to our co-pending patent application Serial No. 530,907 filed August 26, 1955 now Patent No. 2,830,051, granted April 8, 1958, in our names for a "Process For The Preparation Of Diesters And Monoesters Of Isocyanuric Acid," cyanuric acid triesters are converted into the corresponding diesters and monoesters, respectively, by heating the cyanuric acid triester in a solvent in the presence of a catalyst, which may be an acid catalyst, or an acid-forming catalyst, or a surface-active catalyst of the type of bleaching earths, in order to form the corresponding diesters and monoesters, respectively, and convert them by rearrangement into the corresponding iso-esters, the formation of monoesters being carried out in the presence of an aromatic hydroxy compound which is used in an amount of 1 to 2 mols for each mol of the cyanuric acid triester and is converted into its ether.

It has now been found that if cyanuric acid triallylester is heated in a solvent in the presence of a catalyst of the above mentioned type and in the presence of 3–5 mols of an aromatic hydroxy compound, conversion of the cyanuric acid triallylester into iso-cyanuric acid monovinylester takes place.

As examples of aromatic hydroxy compounds, adapted to be used in carrying out the present invention phenol ($C_6H_5OH$), chlorinated phenols, e. g. o-chlorophenol, 3,5-dichlorophenol and alkylated phenols, e. g. the various cresols and the various xylenols are mentioned.

In carrying out the process of the invention preferably solvents are used in which a sufficiently high reaction temperature can be obtained and in which the substances to be formed are as little as possible soluble at ordinary room temperature, e. g. 15°–20° C. In using such solvents, the desired reaction products can be isolated simply by filtration after cooling off the reaction mixture. As examples of such solvents aromatic hydrocarbons, e. g. benzene, toluene, xylene, cumene, and chlorinated aliphatic hydrocarbons, are mentioned.

The catalysts used should be acid catalysts, or acid forming catalysts, or surface-active catalysts of the type of bleaching earths, e. g. boron trifluoride diacetic acid which gave the best results, or bleaching earths of acid character. The former can be used in an amount of 0.5–5% and the bleaching earths in an amount of 1–10%, based on the weight of the triester used as the starting material.

In order to carry out the process of the invention, the solution of the triester in the solvent is carefully heated in the presence of the catalyst to boiling temperature of the solvent and is maintained at this temperature until the reaction is completed. The reaction mixture is then allowed to cool, whereby the reaction product separates by crystallization and is recovered by filtration. If a bleaching earth or the like is used as catalyst, the latter is removed by filtration of the solution which has been kept as hot as possible, whereupon the filtered hot solution is further processed in the above described manner. The reaction can also be carried out by heating a mixture of the solvent and catalyst and to add the triester and the aromatic hydroxy compound in small portions in order to moderate the reaction.

The ethers formed in the presence of aromatic hydroxy compounds can be recovered from the filtered liquid, after the removal of the solvent, by distillation.

The following examples describe some embodiments and best modes of carrying out the invention, to which the invention is not limited.

The isocyanuric acid monovinylester is a white crystalline substance which can be easily recrystallized from hot water. It melts above 330° C. whereby decomposition of the substance occurs.

Example 1

100 parts of triallyl cyanurate and 110 parts of phenol, corresponding to a molecular ratio of 1:3, are dissolved in 200 ml. of xylene and to the solution 1 part of boron trifluoride diacetic acid is added. The solution is heated to about 100° C. whereby a strong exothermic reaction occurs which is moderated by cooling. After the reaction is completed, the reaction mixture is cooled to 20° C., whereby a crystalline precipitate is formed and separated from the liquid by filtration. 61 parts of isocyanuric acid monovinylester are thus obtained, corresponding to 98% of the theory.

From the filtered liquid phenol allylether having a B. P.$_{.11}$=72.5° C. can be recovered by distillation.

Example 2

50 parts of traillyl cyanurate and 60 parts of p-cresol, corresponding to a molecular ratio of 1:3, are dissolved in 125 ml. of xylene and to the solution 5 parts of the bleaching earth known in commerce under the name "Bleichton" are added. The mixture is heated under stirring to boiling and kept boiling under reflux for about 3 hours. The bleaching earth catalyst is then separated from the hot solution by filtration and the filtered liquid is allowed to cool whereby the isocyanuric acid monovinylester separates in crystalline form. 13 parts of isocyanuric acid monovinylester are thus obtained corresponding to 42% of the theory.

It will be understood from the above that this invention is not limited to the details specifically described above and can be carried out with various modifications without departing from the scope of the invention as defined in the appended claims. For example, instead of the catalyst used in the above Example 1, other acid or acid-forming catalysts, e. g. boron trifluoride acetic acid, boron trifluoride, $AlCl_3$, $ZnCl_2$, $TiCl_4$, $FeCl_3$, or mixtures of these halides, chloroacetatofluoboric acid, if desired in mixture with lactatofluoboric acid, oleatofluoboric acid, or benzoatofluoboric acid, can be used. The surface active catalysts used according to this invention are surface-active inorganic materials which are known in commerce under the name "bleaching earths" and are described, for example, in the monographs "Oskar Kausch: Das Kieselsäuregel and die Bleicherden" and "Eckhard-Wirzmüller: Die Bleicherden, ihre Gewinnung und Verwendung." Specific examples of these catalysts are the bleaching earths known in commerce under the name "Bleichton C," "Tonsil AC," fuller's earth, and activated clays of the bentonite group.

The parts and percent described in this application are by weight if not otherwise stated. The symbol "B. P.$_{.11}$" denotes the boiling temperature at a pressure of 11 mm. of mercury.

The product prepared according to this invention can be used as an intermediate product in the manufacture of dyes, pharmaceuticals and synthetic plastics.

What is claimed is:

1. A process for preparing isocyanuric acid monovinylester from triallyl cyanurate, comprising heating triallyl cyanurate in a boiling aromatic liquid hydrocarbon solvent, in the presence of an alkylation catalyst selected from the group consisting of boron trifluoride diacetic acid and surface-active bleaching earth catalysts and in the presence of 3 to 5 mols of a phenolic compound, selected from the group consisting of phenol ($C_6H_5OH$), chlorinated phenols, cresols and xylenols, for each mol of the triallyl cyanurate, until said monovinylester is formed.

2. A process as claimed in claim 1 in which borontrifluoride diacetic acid is used as catalyst.

3. A process as claimed in claim 1 in which a solvent is used, in which the reaction product is soluble at elevated temperature and from which the reaction product separates upon cooling.

4. A process as claimed in claim 1 in which a surface active bleaching earth is used as catalyst.

5. A process as claimed in claim 4 in which the catalyst is separated from the reaction mixture by filtration of the hot reaction mixture and the filtered liquid is allowed to cool in order to separate the reaction product by crystallization.

No references cited.